United States Patent
Graf et al.

(10) Patent No.: US 7,334,157 B1
(45) Date of Patent: Feb. 19, 2008

(54) RESTORE OF DATA TO A COMPUTER SYSTEM HAVING DIFFERENT HARDWARE

(75) Inventors: Nicholas R. Graf, Austin, TX (US); Okan Okcu, Austin, TX (US)

(73) Assignee: Symantec Operating Corporation, Mountain View, CA (US)

(*) Notice: Subject to any disclaimer, the term of this patent is extended or adjusted under 35 U.S.C. 154(b) by 790 days.

(21) Appl. No.: 10/788,143

(22) Filed: Feb. 26, 2004

(51) Int. Cl.
*G06F 11/00* (2006.01)

(52) U.S. Cl. ............... 714/13; 714/6; 714/15; 714/20

(58) Field of Classification Search .......... 714/6, 714/13, 15, 20
See application file for complete search history.

(56) References Cited

U.S. PATENT DOCUMENTS

| | | | |
|---|---|---|---|
| 5,598,563 A | 1/1997 | Spies | |
| 5,708,604 A | 1/1998 | Fontana et al. | |
| 5,708,654 A | 1/1998 | Arndt et al. | |
| 5,715,456 A | 2/1998 | Bennett et al. | |
| 5,732,282 A | 3/1998 | Provino et al. | |
| 5,802,365 A | 9/1998 | Kathail et al. | |
| 5,890,204 A | 3/1999 | Ofec et al. | |
| 6,078,990 A | 6/2000 | Frazier | |
| 6,170,055 B1 | 1/2001 | Meyer et al. | |
| 6,185,686 B1 | 2/2001 | Glover | |
| 6,346,954 B1 | 2/2002 | Chu et al. | |
| 6,640,291 B2 | 10/2003 | Fujibayashi et al. | |
| 6,654,830 B1 | 11/2003 | Taylor et al. | |
| 6,681,323 B1 | 1/2004 | Fontanesi et al. | |
| 6,725,715 B2 | 4/2004 | Igarashi et al. | |
| 6,735,715 B1 | 5/2004 | Graham | |
| 6,820,035 B1 | 11/2004 | Zahavi | |
| 7,024,581 B1* | 4/2006 | Wang et al. | 714/6 |
| 7,069,402 B2* | 6/2006 | Coulter et al. | 714/6 |
| 7,093,086 B1* | 8/2006 | van Rietschote | 714/13 |
| 7,107,534 B1 | 9/2006 | de Jong et al. | |
| 2002/0019908 A1 | 2/2002 | Reuter et al. | |
| 2003/0074527 A1 | 4/2003 | Burton et al. | |
| 2003/0159070 A1 | 8/2003 | Mayer et al. | |

(Continued)

OTHER PUBLICATIONS

"Automated System Recovery with VERITAS Netbackup™," VERITAS Bare Metal Restore, White Paper, VERITAS Software Corp. 2002, pp. 1-10.

(Continued)

*Primary Examiner*—Robert Beausoliel
*Assistant Examiner*—Joseph D Manoskey
(74) *Attorney, Agent, or Firm*—Lawrence J. Merkel; Meyertons, Hood, Kivlin, Kowert & Goetzel, P.C.

(57) ABSTRACT

In some embodiments, a computer accessible medium comprises a plurality of instructions which, when executed: cause a modification of an image of files created from a computer system having first hardware; and cause the image to be copied to a computer system having second hardware different from the first hardware. A difference between the first hardware and the second hardware necessitates that the modification of the image be performed. For example, the difference may indicate that a different device driver is to be included in the image, or that HAL or kernel code is to be changed. A similar method of modifying the image and copying the image is also contemplated.

30 Claims, 9 Drawing Sheets

U.S. PATENT DOCUMENTS

2003/0195995 A1 10/2003 Tabbara
2004/0091175 A1 5/2004 Beyrouti
2004/0111250 A1 6/2004 Hensley
2005/0044096 A1* 2/2005 Caliendo et al. ............ 707/102

OTHER PUBLICATIONS

"Windows Architecture," Steven Roman, Chapter 9 from *Win32 API Programming with Visual Basic*, published by O'Reilly and Associates, Inc., 2000 Microsoft Corporation, 6 pages.

"Automated Deployment Services Technical Overview," Microsoft Corporation, Aug. 2003, pp. 1-25.

"CBMR-Dissimilar Hardware Recovery," CBMR Support, Jun. 2005, 9 pages.

U.S. Appl. No. 11/351,778, filed Feb. 10, 2006.

Office Action from U.S. Appl. No. 10/774,039, mailed Apr. 19, 2007.

Office Action from U.S. Appl. No. 10/788,120, mailed Apr. 6, 2007.

* cited by examiner

RESTORE OF DATA TO A COMPUTER SYSTEM HAVING DIFFERENT HARDWARE

BACKGROUND OF THE INVENTION

1. Field of the Invention

This invention is related to snapshotting data to an image (e.g. via a backup, replication, or as a provisioning image) and restoring the image to a computer system having different hardware.

2. Description of the Related Art

Various software tools existing for backing up computer systems and restoring backup data to computer systems. Such tools are provided to permit recovery, at least to the most recent backup state, from user error, hardware failure in the backed-up computer system, or other disaster situations originating outside the computer system that cause data loss such as by damaging the computer system. User error may include activities such as accidental file deletion, file corruption, or erroneous file content change.

In the case of a hardware failure or disaster situation that damages the computer system, either hardware components in the computer system may be replaced or the entire computer system may be replaced. Generally, either the same or equivalent hardware must be provided in the replacement to permit restoring the backup to the computer system. If the same or equivalent hardware is not used, then different drivers may be required in the operating system (which is included in the backup data). Additionally, if the operating system includes a hardware abstraction layer (HAL) or low level kernel code that varies based on the hardware included in the computer system, the HAL and/or kernel code may be required. Since the drivers, HAL, and kernel are included in the backup, simply restoring the backup will not result in a bootable system.

As computer systems age, they become more likely to experience a hardware failure as the hardware "wears out". Thus, as computer systems age, they become more likely to need a restoration from a backup. Unfortunately, since the hardware in the system is dated, an older computer system is also less likely to be repaired with the same hardware. That is, the same hardware may no longer be available for purchase. Additionally, it may be more cost effective to replace older computer systems with new systems, and thus the likelihood that different hardware may be provided in the system to which the restore is attempted may be further increased.

In the above mentioned situations, for computer systems employing the Windows™ operating system from Microsoft Corporation (Redmond, Wash.), the typical solution is to install the operating system manually on the repaired/new computer system. The backup data can then be restored to the repaired/new computer system. To ensure that the new drivers used by the new hardware are not overridden by the previously installed drivers in the registry, the "KeysNotToResore" feature in the registry may be used to protect the keys corresponding to driver software. However, since the process is manual, it is more likely to have erroneous outcomes and may be time-consuming to troubleshoot.

SUMMARY OF THE INVENTION

In some embodiments, a computer accessible medium comprises a plurality of instructions which, when executed: cause a modification of an image of files created from a computer system having first hardware; and cause the image to be copied to a computer system having second hardware different from the first hardware. A difference between the first hardware and the second hardware necessitates that the modification of the image be performed. For example, the difference may indicate that a different device driver is to be included in the image, or that HAL or kernel code is to be changed. A similar method of modifying the image and copying the image is also contemplated.

In other embodiments, a computer accessible medium comprises a plurality of instructions. The instructions, when executed, compare operating system data from an image created from a computer system having first hardware to corresponding operating system data from a source. The corresponding operating system data identifies one or more hardware devices in a computer system having second hardware. The operating system in the image is not executing. In response to detecting that at least a first hardware device in the second hardware is not in the first hardware, the instructions, when executed, add at least a first driver corresponding to the first hardware device to the image. The operating system data in the image that identifies the first hardware device is updated with the corresponding operating system data from the source.

BRIEF DESCRIPTION OF THE DRAWINGS

The following detailed description makes reference to the accompanying drawings, which are now briefly described.

Figure 1:
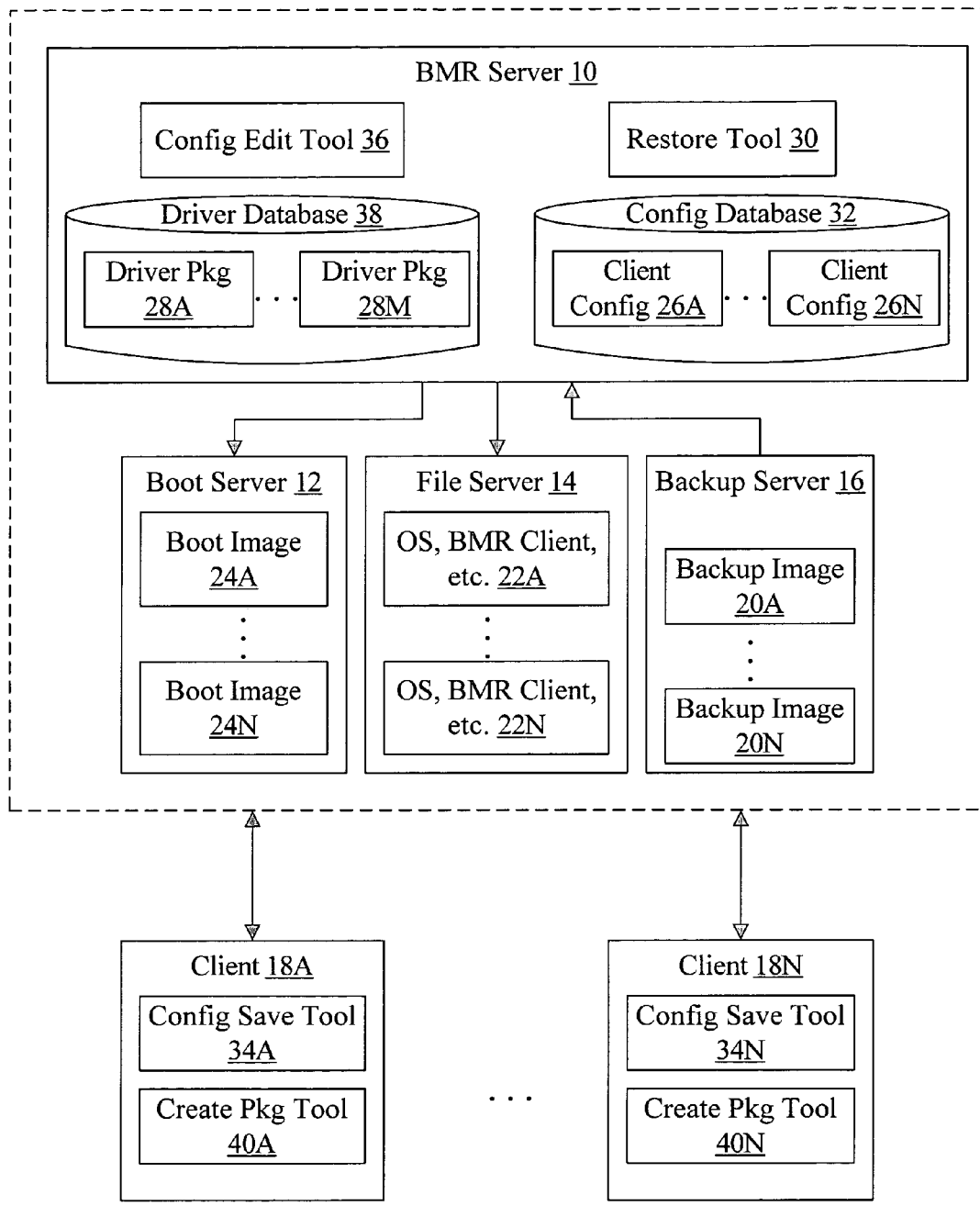
FIG. 1 is a block diagram of one embodiment of a set of servers and clients.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system comprising several servers and clients is shown. In the illustrated embodiment, a bare metal restore (BMR) server 10, a boot server 12, a file server 14, a backup server 16, and a set of clients 18A-18N are shown. Any number of clients 18A-18N may be included in various embodiments. The BMR server 10 is coupled to the boot server 12, the file server 14 and the backup server 16. The clients 18A-18N are generally configured to interact with the servers 10, 12, 14, and 16, and may be coupled to the servers 10, 12, 14, and 16. FIG. 1 is illustrative of logical relationships between the servers and clients. Physical connection may be established in any desired fashion (e.g. any type of network, combinations of networks, shared memory, etc.).

Each of the clients 18A-18N comprises a computer system that may be backed up and restored using the servers 10, 12, 14, and 16. Data corresponding to each client 18A-18N is backed-up in a respective backup image 20A-20N on the backup server 16. The backup images 20A-20N may be the most recent backup image of each client 18A-18N. Other, preceding backup images corresponding to various clients may also be retained on the backup server 16 or other storage. In some cases when a restore is to be performed, the data in a given backup image 20A-20N may have been backed up from the corresponding client 18A-18N previously, and may be restored due to a failure in the corresponding client 18A-18N (either hardware, software, or a combination thereof) or other loss of the data in the corresponding client 18A-18N. In some cases of a hardware failure in the corresponding client 18A-18N, the failing hardware may be replaced with different hardware. Alternatively, if a restore is to be performed, the data may have been backed up from another computer system (not shown) that subsequently experienced an irreparable failure or is otherwise being replaced by the corresponding client 18A-18N. The backup server 16 may implement any backup solution (e.g. the VERITAS NetBackup™ product from VERITAS Software Corporation, or any other VERITAS backup product or backup product from any other vendor). As used herein, the term "image" may refer to any copy of the data from a computer system (e.g. files, including both data files and files containing software instructions to be executed on the computer system). A backup image may be an image made as a backup of the data on the computer system. Other images may be created due to replication (e.g. volume or file replication), snapshot images used with provisioning software as an image to install on other computer systems, etc. In some cases, the image may comprise the set of files from the corresponding client stored in the same directory structure that the client uses, relative to a directory on the backup server 16 designated as the "root" (e.g. a directory on the backup server 16 may correspond to the root on the client system). In other embodiments, an image may comprise a block-by-block copy of the data from the storage devices in the client.

At the time that a backup is performed from a client 18A-18N, a record is made of the system configuration of that client 18A-18N. The record is illustrated as the client configuration files 26A-26N in the configuration database 32 on the BMR server 10 in FIG. 1, although the record may be stored in any form. In some embodiments, the client configuration files 26A-26N may be part of the respective backup images 20A-20N as well, or the client configuration files 26A-26N may be stored only as part of the respective backup images 20A-20N and may be retrieved by the BMR server 10 when a client restore is to be performed. In one embodiment, each of the clients 18A-18N may have a config save tool 34A-34N installed to generate the corresponding client configuration files 26A-26N. The config save tool may comprise software (that is, a plurality of instructions) which, when executed, generates the client configuration file.

The client configuration files 26A-26N may store various information describing the corresponding client system 18A-18N configuration. For example, the system configuration may identify the device drivers (or more briefly, "drivers") used by the corresponding client system. As used herein, a "device driver" or "driver" may comprise any software that is used to control a hardware device included in a computer system and that may provide a higher level (more abstract) interface for other software to use in order to interact with the hardware device. Hardware devices controlled by device drivers may include mass storage device (MSD) controllers such as small computer systems interface (SCSI) controllers, integrated device electronics (IDE) controllers, etc. Generally, an MSD controller may be any controller that is capable of interfacing to one or more mass storage devices such as disk drives, tape drives, compact disk (CD) drives, digital versatile disk (DVD) drives, etc. Hardware devices controlled by device drivers may further include network interface cards (NICs) or on board circuitry that implements the same function as a NIC. Still further, hardware devices controlled by device drivers may include video controllers/displays, audio controllers, peripheral bus controllers (also referred to as host bus adapters, or HBAs), and any other peripheral devices that may be included in or coupled to a computer system. The client configuration file 26A-26N may further include any other desired information (e.g. the number, type, and size of storage devices in the client system, the volumes on the storage devices, including the layout of volumes on the storage devices and the attributes of the volumes, the number and type of processors, the amount of memory, information on other peripheral devices, etc.).

The file server 14 may provide the clients 18A-18N with various software (reference numerals 22A-22N, respectively) used during the restore process, which may include the operating system software (e.g. operating system commands and libraries), BMR client software, backup client software, etc. The file server 14 may implement any file system usable over a network (e.g. network file system (NFS), Server Message Block (SMB) for Microsoft Windows™ or Samba for Unix-like implementations, etc.). The boot server 12 may be used to provide respective boot images 24A-24N to the clients 18A-18N. When a client 18A-18N is booted to perform a restore, the client 18A-18N may use standard network boot protocols to boot using the respective boot image 24A-24N. The boot images 24A-24N may include a customized restore procedure created by a restore tool 30 on the BMR server 10, to restore the client 18A-18N to the state corresponding to the respective backup image 20A-20N. In some embodiments, a media boot is supported in which the boot image 24A-24N and software 22A-22N are stored on a computer accessible medium such as a compact disc, and the disc is used to boot the client 18A-18N. In such embodiments, the boot server 12 and the file server 14 may be eliminated. In the present embodiment, a client 18A-18N at the beginning of the restore process to that client may be "bare metal". That is, no operating system software or other software may yet be installed (although firmware may be included in the client).

If a backup image 20A-20N is to be restored to a client 18A-18N (referred to more briefly as the "target client") that includes different hardware than the computer system from which the backup image 20A-20N was made (referred to more briefly as the "saved client"), the backup image 20A-20N may be modified to execute properly on the target client. For example, if the hardware differences between the saved client and the target client include one or more hardware devices on the target client that use different drivers than the hardware devices on the saved client, the drivers used on the target client are added to the backup image 20A-20N. In some cases, the differing hardware devices may replace hardware functionality of hardware devices that were included in the saved client. In other cases, the differing hardware devices may provide new hardware functionality not included in the saved client. Adding the drivers may involve inserting the driver file (or files) into an appropriate directory in the backup image 20A-20N, and may also include updating one or more operating system files that map drivers to devices (e.g. the registry in the Microsoft Windows™ operating system). The hardware differences between the saved client and the target client may also necessitate a different hardware abstraction layer (HAL) and/or different kernel. The HAL may generally provide a consistent, device independent interface for applications to use, abstracting out various hardware differences across hardware platforms. The kernel may be the central module of the operating system, providing various services to other parts of the operating system (e.g. memory management, disk management, process and task management, etc.). The HAL and kernel may be modified by changing the files containing the HAL and kernel code in the backup image 20A-20N.

In other embodiments, data files in the backup image 20A-20N may be modified. For example, various configuration files used by the operating system software within the backup image 20A-20N may be modified. Particularly, the media access controller (MAC) address of the NIC or NICs in various configuration files may be changed to match the target client.

In some embodiments, the backup image 20A-20N may be modified after being copied to the target client. For example, the restore procedure generated by the restore tool 30 may include instructions which, when executed, modify the backup image 20A-20N on the target client (prior to rebooting the client to activate the operating system in the backup image 20A-20N). In other embodiments, the backup image 20A-20N may be modified prior to being copied (e.g. on the backup server 16 or the BMR server 12). In such embodiments, for example, the restore tool 30 may perform the modifications. Thus, generally, the restore tool 30 may cause modifications to be made to the backup image 20A-20N and may cause the copy of the backup image 20A-20N to the target client. The restore tool 30 may cause the modifications directly (e.g. making the modifications itself), or may cause the modification indirectly (e.g. by generating the restore procedure, including instructions which make the modification when executed on the target client or which invoke BMR client software on the target client to make the modification). The restore tool 30 may cause the restore directly (e.g. copying the backup image 20A-20N to the target client) or indirectly (e.g. by generating the restore procedure, including instructions which perform the restore when executed on the target client or which invoke BMR client software on the target client to perform the restore).

In one embodiment, the restore tool 30 uses the client configuration file 26A-26N corresponding to the saved client to perform the restore. Particularly, the restore procedure may boot the client using drivers indicated in the client configuration file 26A-26N. In order to restore to different hardware in this embodiment, the client configuration file 26A-26N may be edited to change the driver information for the client, the HAL information for the client, and/or the kernel information for the client. The config edit tool 36 may be used to edit the client configuration file. Generally, the config edit tool 36 may comprise software that, when executed, permits a user to change the features of the client configuration file and either save the changed file as a new client configuration file or overwrite the original client configuration file.

In one embodiment, each of the BMR server 10, the boot server 12, the file server 14, and the backup server 16 may comprise computer systems configured to execute the corresponding server software. In some embodiments, one or more of the servers 10, 12, 14, and 16 may be combined onto the same physical computer system, as desired.

The drivers provided when the target client has different hardware than the saved client may be drawn from different sources. For example, drivers may be published into a driver database 38 on the BMR server 10. The driver database 38 may comprise various driver packages 28A-28M, each containing driver files and various other driver configuration information (e.g. INF files used in the Microsoft Windows™ operating system). The clients 18A-18N may include a create package tool 40A-40N that may be used to publish drivers into the driver database 38. The user may select drivers from the driver database 38 when editing the client configuration file 26A-26N. Alternatively, drivers may be provided from other sources (e.g. another client configuration file, drivers shipped by the manufacturer of a device on a storage media, drivers downloaded from a network source such as the Internet, etc.).

As used herein, the term "restore" may include preparing a target client to store an image and copying the image to the target client. Booting the operating system from the image on the target client may be referred to as "activating" the operating system on the target client.

In the illustrated embodiment, there is a boot image 24A-24N and a software image 22A-22N for each backup image 20A-20N (and for each client 18A-18N). In other embodiments, one boot image 24A-24N may be used for multiple backup images 20A-20N (and for multiple clients 18A-18N). Thus there may not be a one-to-one relationship between boot images 24A-24N and backup images 20A-20N (and clients 18A-18N). Similarly, in some embodiments, one software image 22A-22N may be used for multiple backup images 20A-20N (and for multiple clients 18A-18N). Thus there may not be a one-to-one relationship between software images 22A-22N and backup images 20A-20N (and clients 18A-18N).

Figure 2:
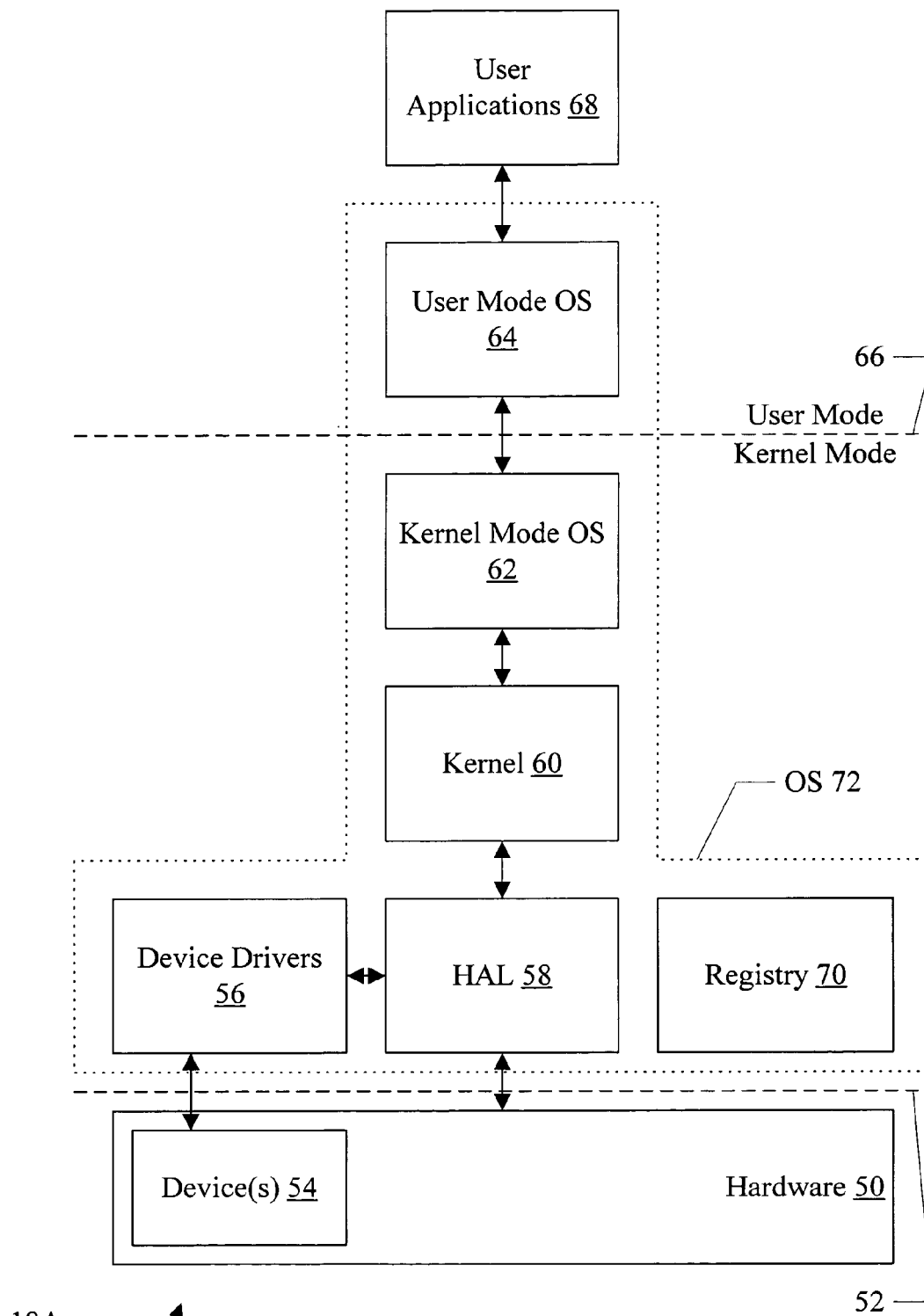
FIG. 2 is a block diagram of one embodiment of a computer system including hardware and software components.

Turning now to FIG. 2, a block diagram illustrating an exemplary client 18A in more detail is shown. Other clients may be similar. In the illustrated embodiment, the client 18A may include hardware 50 and various software components. The software and hardware portions of the client 18A are separated by dashed line 52. The hardware 50 may include one or more hardware devices 54 which may be controller by corresponding device drivers 56.

The device drivers 56 may be software components of the client 18A. Additionally, the software components may include the HAL 58 and the kernel 60. The remainder of the operating system (OS) may be divided into the kernel mode OS 62 and the user mode OS 64. As indicated by the dotted line 66, the device drivers 56, the HAL 58, the kernel 60, and the kernel mode OS 62 operate in kernel mode (e.g. at a higher privilege level on the processor(s) included in the hardware 50). The user mode OS, as well as various user applications 68, operate in user mode (e.g. at a lower privilege level). The kernel mode OS 62 may include various executive services (e.g. I/O management, cache management, filesystem management, runtime libraries, etc.). The user mode OS 64 may generally include the APIs for the user applications 68, various environment functions, user mode system processes, and an interface to the kernel mode OS 62. Also shown in FIG. 2 is the registry 70. The registry 70 may include an identification of the drivers used on the client 18A, as described above. Additionally, the registry 70 may serve a variety of other functions in the Microsoft Windows™ operating system. In other operating systems, the function of mapping drivers to devices may be handled by other operating system files. Generally, the user mode OS 64, the kernel mode OS 62, the kernel 60, the HAL 58, the device drivers 56, and the registry 70 may comprise the OS 72 in this embodiment.

Figure 3:
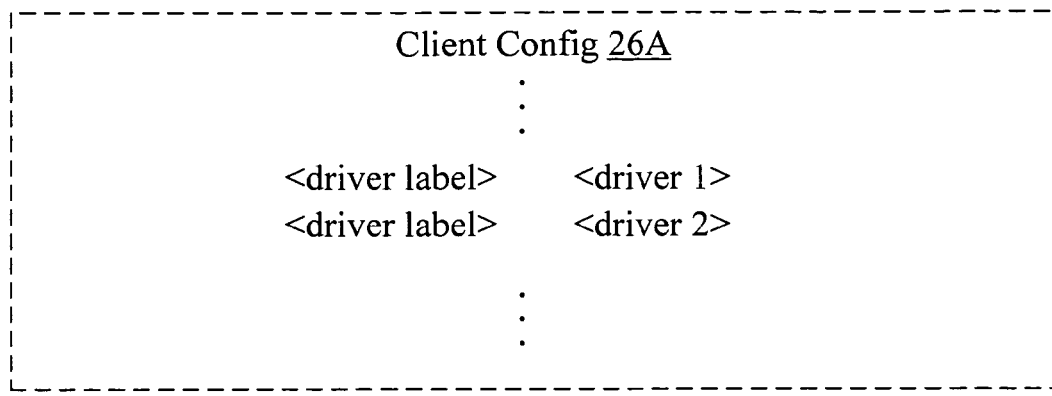
FIG. 3 is a block diagram of one embodiment of a client configuration file.

Turning next to FIG. 3, a block diagram of one embodiment of the client configuration file 26A (corresponding to client 18A) is shown. Other client configuration files may be similar. FIG. 3 illustrates the client configuration file 26A including an identification of various drivers included in the corresponding client 18A. In the illustrated embodiment, the client configuration file 26A may include a driver label indicating that a driver is being identified. FIG. 3 shows "<driver label>" to indicate that any value may be used to indicate that a driver is being identified. After the driver label, a second value (represented by "<driver1>" in FIG. 3) identifies the driver. For example, the second value may comprise the name of the driver file, and may include a path to the driver file, in some embodiments. In other embodiments, the second value may comprise the base name of the driver file (without the file extension, such as ".SYS" in the Microsoft Windows™ operating system) to identify the components of the driver package (e.g. the driver file, plus any setup files that may be used by the operating system to install the driver file).

Multiple drivers may be identified, each proceeded by the driver label, as shown in FIG. 3. Alternatively, the drives may be identified in a list, preceded by a single instance of the driver label. It is noted that, at various points in this description and in the drawings, text may be enclosed in "<" and ">" symbols. Such text is intended to be a generic identifier, not specifically the value that may occur at that point.

Figure 4:
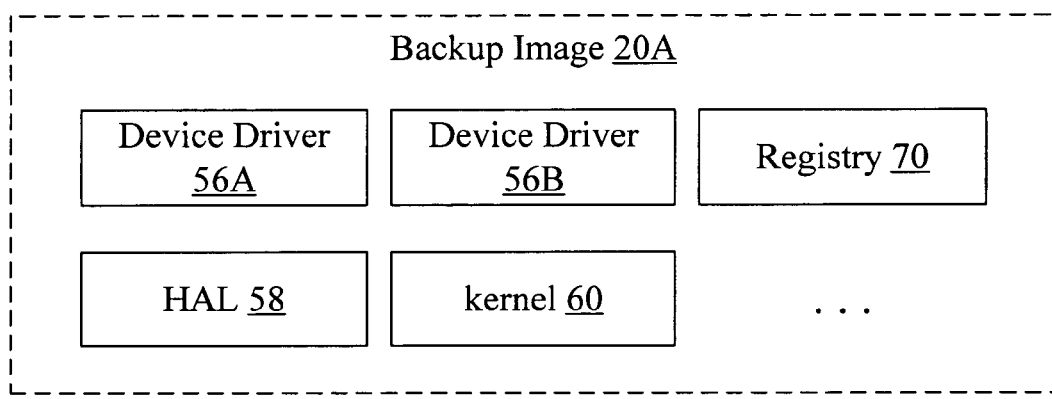
FIG. 4 is a block diagram of one embodiment of a backup image.

FIG. 4 is a block diagram illustrating a portion of one embodiment of the backup image 20A. In the embodiment of FIG. 4, the backup image 20A may include various device drivers 56 (e.g. drivers 56A and 56B shown in FIG. 4), the registry 70, the HAL 58, and the kernel 60. In various embodiments, the backup image 20A may include any software components (e.g. the various components shown in FIG. 2). Each software component may comprise one or more files storing the instructions that form the software, along with any configuration data files, etc. The backup image 20A may further include any user data files from the saved client.

Figure 5:
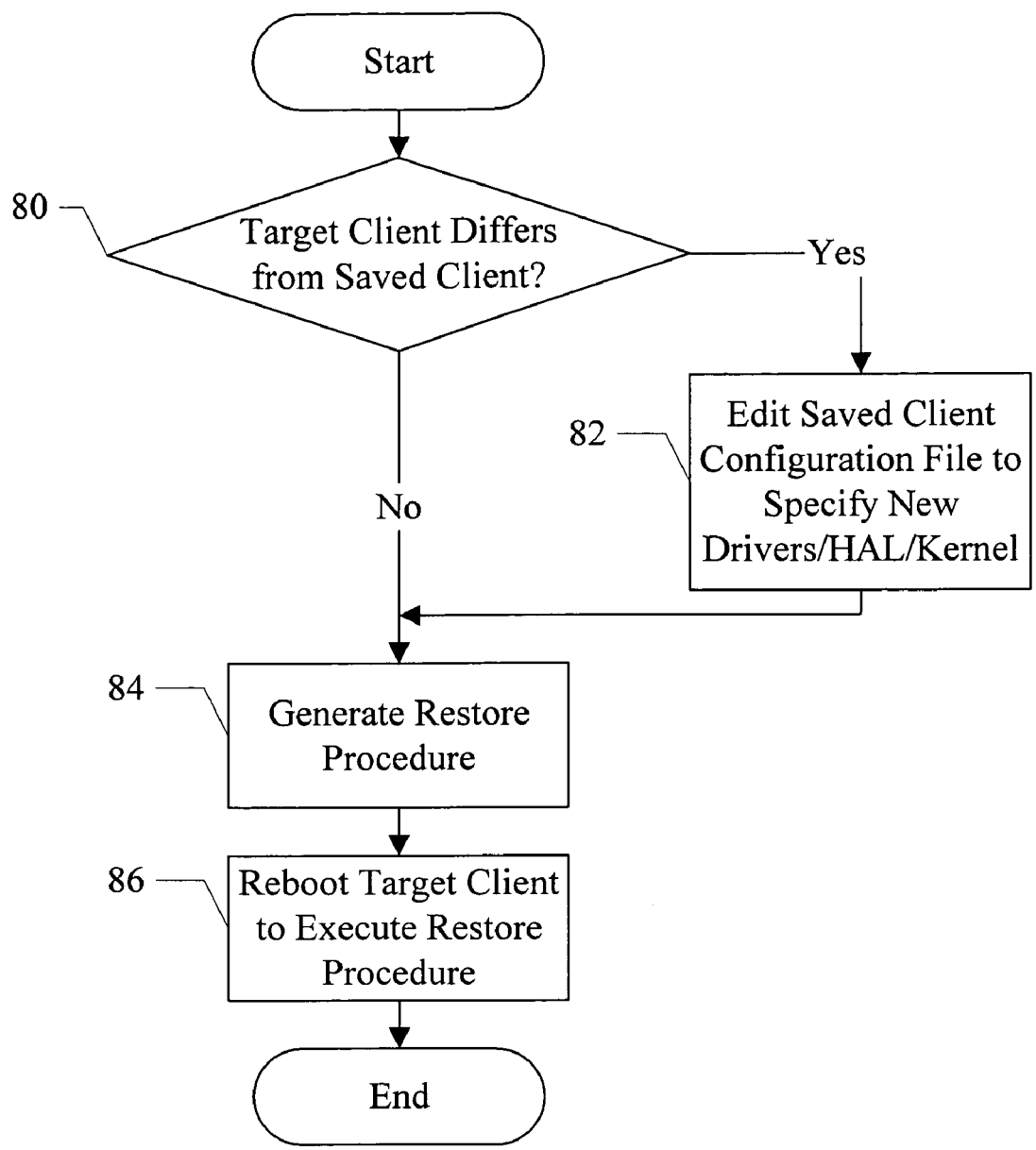
FIG. 5 is a flowchart illustrating one embodiment of restoring the backup image to a client.

Turning next to FIG. 5, a flowchart is shown illustrating operation during a restore, including operation of one embodiment of the restore tool 30 and the config edit tool 36. In some embodiments, the restore tool 30 and the config edit tool 36 are implemented in software. In such embodiments, the restore tool 30 and the config edit tool 36 may each include a plurality of instructions which, when executed, implement the operation assigned to the restore tool 30 and the config edit tool 36, respectively, in the flowchart of FIG. 5.

The restore tool 30 may determine if the target client differs from the saved client (decision block 80). That is, the restore tool 30 may determine if hardware included in the target client differs from hardware in the saved client in such a way that the backup image is to be modified before the operating system in the backup image is activated. In other embodiments, decision block 80 may be a user decision, and the user may employ the restore tool 30 and/or the config edit tool 36 to effect the restore of the backup image with the appropriate modifications to operate on the target client. If the target client does not differ from the saved client (decision block 80, "no" leg), modifications to the backup image may not be required and the restore tool 30 may continue by generating the restore procedure. If the target client does differ from the saved client (decision block 80, "yes" leg), the config edit tool 36 may be invoked to modify the saved clients' configuration file (block 82). Particularly, the config edit tool 36 may be used to specify added drivers for the target client hardware, as well as to change the HAL/kernel specifications in the client configuration file, if needed.

Figure 6:
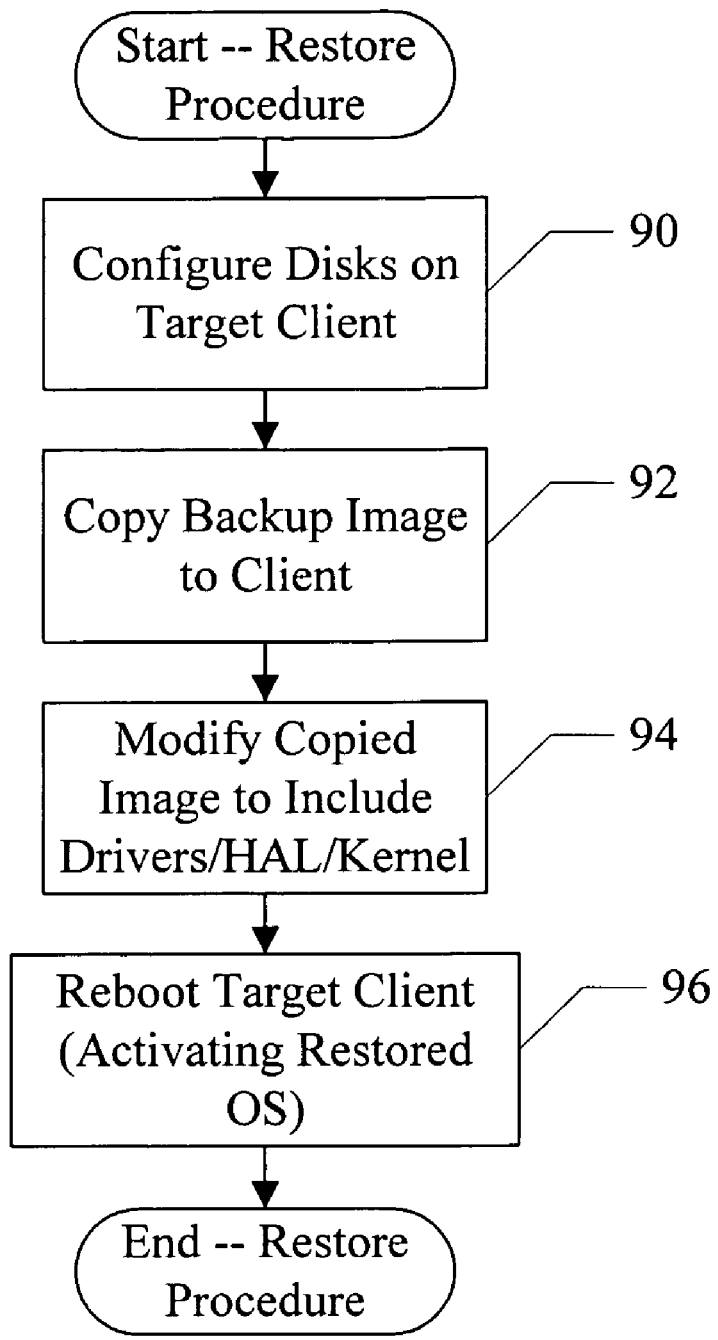
FIG. 6 is a flowchart illustrating one embodiment of a restore procedure that may execute on the client.

The restore tool 30 may generate the restore procedure for the target client (e.g. part of the boot image 24A-24N for the target client, in the embodiment of FIG. 1). The restore procedure is generated using the client configuration file (as modified by the config edit tool 36, if applicable) (block 84). One embodiment of the restore procedure is illustrated in FIG. 6. The target client may then be restored (block 86). Restoration of the target client may occur, in this embodiment, by the client 18 booting and executing the boot image 24 (including the restore procedure).

Turning now to FIG. 6, a flowchart is shown illustrating operation of one embodiment of the restore procedure (when executed on the target client). The restore procedure may be implemented in software. In such embodiments, the restore procedure may include a plurality of instructions which, when executed, implement the operation assigned to the restore procedure in the flowchart of FIG. 6.

The restore procedure may configure the disks on the target client (block 90). For example, the volumes specified in the client configuration file of the saved client may be created on the target client's disks. In some embodiments, different disk configurations may be supported on the target client than on the saved client. In such embodiments, the user may be permitted to map volumes from the saved client onto the new configuration and corresponding changes may be made to the client configuration file prior to generating the restore procedure.

The restore procedure may copy the backup image to the target client (block 92). If the hardware differences in the target client's hardware as compared to the saved client's hardware necessitate driver changes, HAL changes, and/or kernel changes, the restore procedure may modify the copied image to effect the changes (block 94). For example, the restore procedure may add driver files to the driver directory (or directories) within the copied image. Additionally, the restore procedure may modify the registry in the image to activate the newly added drivers for the appropriate hardware devices. HAL code files and/or kernel code files may also be modified or added if HAL or kernel modifications are indicated. After the copied image has been modified, the restore procedure may reboot the target client (thus activating the restored OS) (block 96).

It is noted that, while the restore procedure has been described as performing the flowchart of FIG. 6, other embodiments may implement some of the functionality of FIG. 6 in the BMR client software that may be accessible from the file server 14. For example, blocks 94 and 96 may be implemented in the BMR client software. In other embodiments, block 92 may also be implemented in the BMR client software. Alternatively, backup client software may implement block 92. BMR client and/or backup client software may be available from the file server 14.

Figure 7:
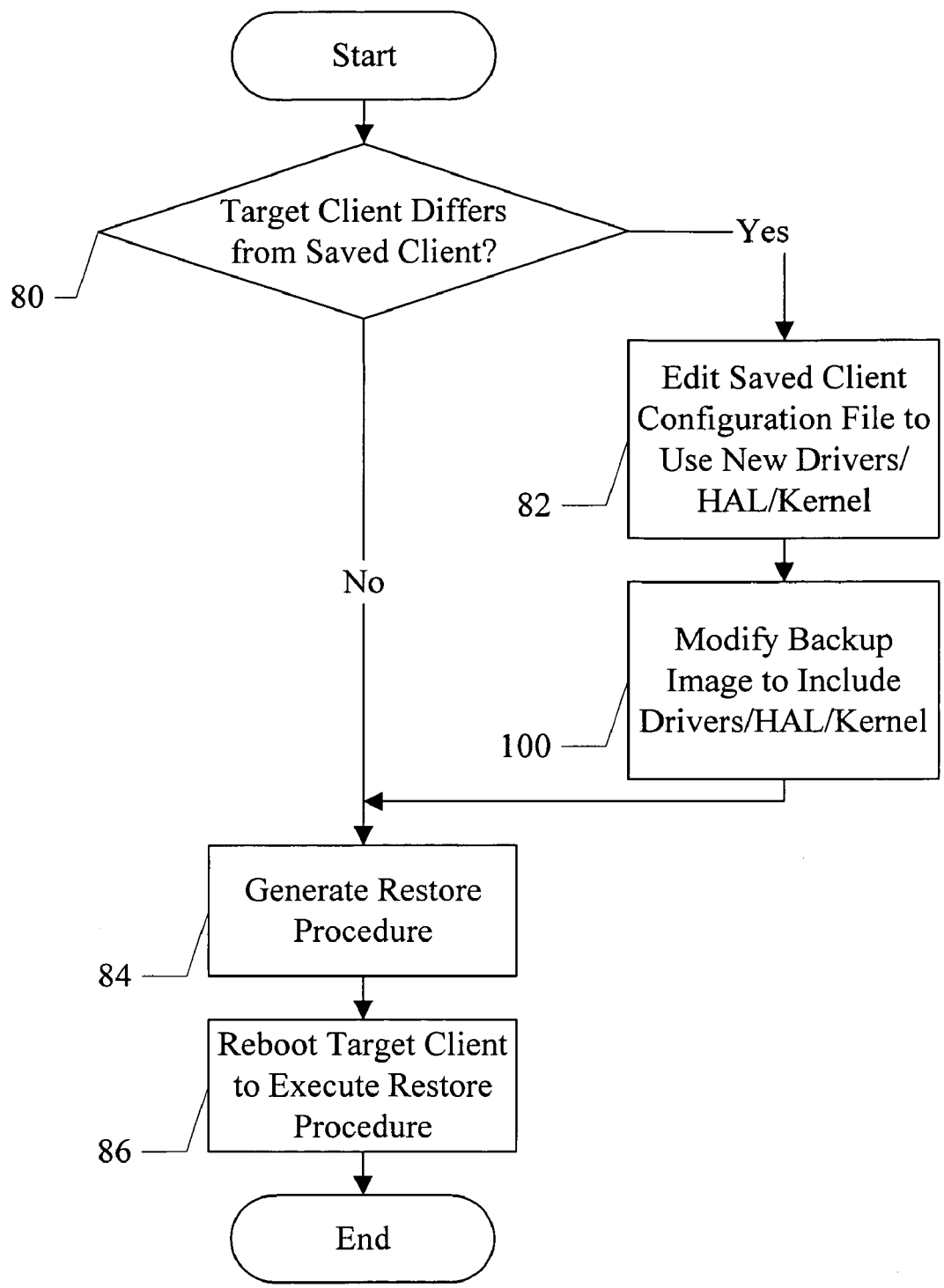
FIG. 7 is a flowchart illustrating a second embodiment of restoring the backup image to the client.

The embodiment of FIGS. 5 and 6 modify the saved client's backup image on the target client, after copying the image to the target client. Other embodiments may modify the image elsewhere, prior to copying the image to the target client. For example, FIG. 7 is a flowchart illustrating an embodiment in which the image is modified on the backup server 16. Generally, the backup image may be modified at any time prior to activating the operating system within the backup image on the target client. Viewed in another way, the modification of the backup image to include different drivers may be a mechanism for "installing" drivers in an operating system that is idle (i.e. not executing).

Similar to the flowchart of FIG. 5, whether or not the target client differs from the saved client is determined (decision block 80). If the target client does differ from the saved client (decision block 80, "yes" leg), the config edit tool may be invoked to edit the saved client's configuration file (block 82). In addition, software may be invoked to modify the backup image to include drivers, HAL code file changes, and/or kernel code file changes, as needed (block 100). Block 100 may be similar to block 94 in FIG. 6, except that the modifications are being made to the backup image 20A-20N on the backup server 16. In either case, the restore procedure may be generated (block 84) and the target client rebooted to execute the restore procedure (block 86). The restore procedure generated in the embodiment of FIG. 7 may be similar to the embodiment of FIG. 6, except that block 94 may be eliminated.

Figure 8:
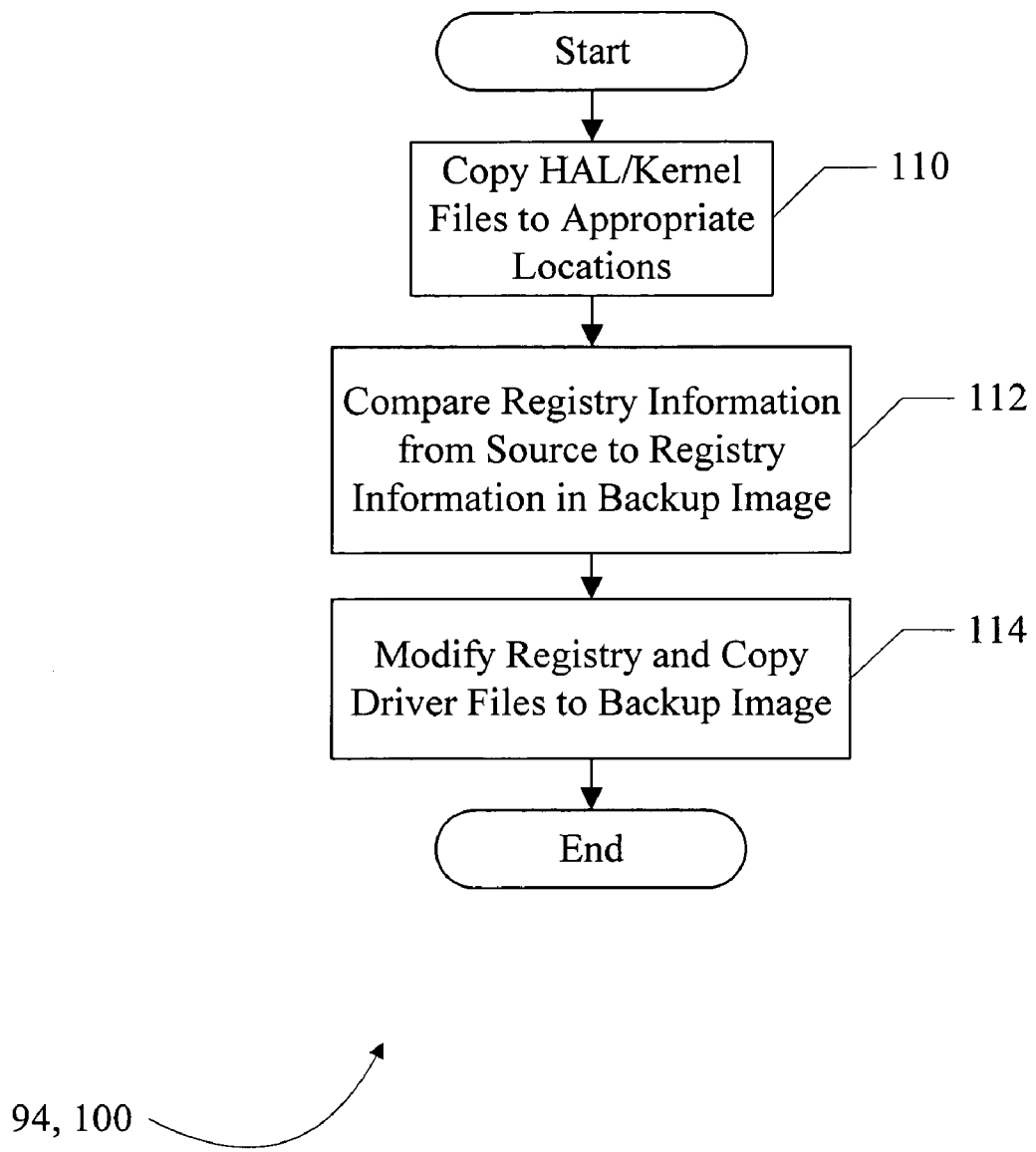
FIG. 8 is a flowchart illustrating one embodiment of modify files in a backup image.

Turning now to FIG. 8, a flowchart illustrating operation of one embodiment of modifying the backup image after the image has been copied to the target client (block 94) or modifying the backup image on the backup server 16 (block 100). The flowchart of FIG. 8 may be implemented in software. In such embodiments, the software may include a plurality of instructions which, when executed, implement the operation shown in FIG. 8.

The embodiment of FIG. 8 may be used, e.g., if a minimally-configured operating system is installed on the target client to execute the restore procedure. The operating system may include the correct drivers, as determined from the potentially-edited client configuration file. Alternatively, the embodiment of FIG. 8 may be used if another operating client has the same or equivalent hardware as the target client. In yet other embodiments, the embodiment of FIG. 8 may be used if there is another backup image corresponding to a client having the same or equivalent hardware as the target client. The target client executing the operating system, the other client, or the backup image may be the "source" referred to in FIG. 8. Generally, a "source" may be any computer system, storage media, etc. that includes operating system data that may be used to compare to corresponding data in the backup image that is to be restored.

If there are HAL/kernel modifications to be made, the HAL/kernel files may be copied to the appropriate directory location within the backup image (block 110). The files may replace existing files in the backup image or may be added files to be stored in the same locations.

Figure 9:
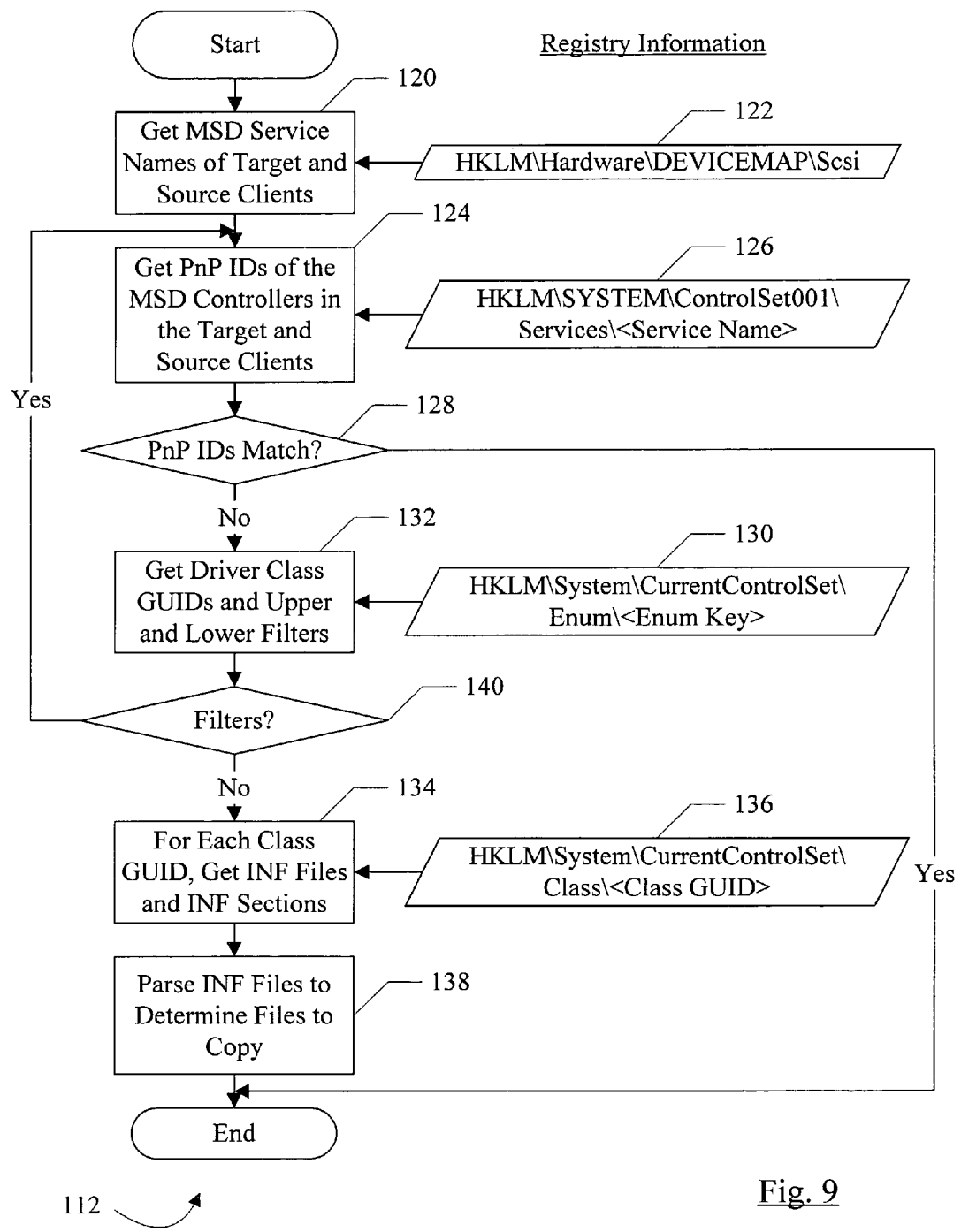
FIG. 9 is a flowchart illustrating one embodiment of comparing Registry information.

The embodiment of FIG. 8 may rely on the registry information to detect which hardware differs between the saved client and the target client and to gather the drivers from the source for insertion into the backup image. Registry information from the source may be compared to the registry information from the registry in the backup image (block 112). Specifically, registry keys related to hardware devices that have corresponding drivers may be compared. In one implementation, MSD controllers may be handled in this fashion, and keys identifying MSD controllers and their drivers may be compared. It may be desirable to handle MSD controllers in this fashion, in some embodiments, because the backup image is stored on the mass storage devices controlled by the MSD controller (or is to be stored on the mass storage devices, if the modification is being performed on the backup server 16). Accordingly, to boot the OS in the backup image, the correct drivers for the MSD controller may be used. In other embodiments, any other hardware devices that have drivers may be handled in this fashion. In still other embodiments, some hardware device drivers may be handled in other fashions (e.g. installation after the operating system has been activated). A more detailed implementation of block 112 for one embodiment employing the Microsoft Windows™ operating system for the MSD drivers is shown in FIG. 9. While the registry is used in this embodiment, other embodiments using other operating systems may compare any operating system information that is used to identify hardware devices and map drivers to the hardware devices. The information provided may be operating-system dependent.

The keys are compared and that differ between the registry in the source and the registry in the backup image may be copied into the registry in the backup image to update the registry with the correct information. Additionally, the registry keys for the differing hardware devices may specify the driver files that may be copied from the source into the backup image. The differing keys and corresponding drivers may be copied from the source to the backup image (block 114).

The present embodiments are described as adding drivers, such as MSD controller drivers, to a backup image. However, other images may be similarly updated. For example, the image used by provisioning software (such as the OpForce™ product from VERITAS Software Corporation) may be updated to change the drivers for provisioning a computer system having differing hardware devices. Such a system may avoid, in some embodiments, a manual install of the corresponding software to snapshot an image having the desired drivers in it. Any automated deployment system may implement the described mechanisms. Similarly, volume or file replication may employ the method to update replicated volumes/files to include the desired drivers, for restoring the replicated volumes/files to a computer system having differing hardware devices.

Turning now to FIG. 9, a flowchart is shown illustrating one embodiment of comparing registry information for MSD controllers to locate registry keys and drivers to be inserted into the backup image (e.g. one embodiment of block 112 in FIG. 8). The flowchart of FIG. 9 may be implemented in software. In such embodiments, the software may include a plurality of instructions which, when executed, implement the operation shown in FIG. 9.

In FIG. 9, input registry keys used for each block are illustrated to the right of the block, connected to the block with an arrow. Character strings in the keys that are not enclosed by "<" and ">" are literal. Character strings in the keys that are enclosed by "<" and ">" are general identifiers representing a set of possible values.

The source registry and the registry in the backup image may be consulted to determine the MSD service names for the target and source clients (block 120). The registry key under which the MSD service names may be found is shown at reference numeral 122. While the registry key indicates SCSI, generally any sort of MSD may be found under this key. In other embodiments, different keys may be used for different types of MSDs (e.g. SCSI, IDE, etc.). For each service name, the registries may be consulted to get the Plug 'n Play identifiers (PnP IDs) of the MSD controllers (block 124). PnP IDs may uniquely identify the manufacturer of the controller and the model number of the controller (and in some cases revision numbers, etc.). That is, the PnP IDs may include enough information to identify the correct driver for the controller, and differing PnP IDs require different device drivers in at least some cases. In other embodiments, any other type of unique identifier may be used. The PnP IDs may be found under the key shown at reference numeral 126 for each service name.

The PnP IDs may be compared between the source and the target. If the PnP IDs match, then the drivers already included in the backup image may be used with the target hardware. Thus, the flowchart of FIG. 9 may exit (decision block 128, "yes" leg). Furthermore, block 114 in FIG. 8 may be skipped as well since no updates to the registry nor added driver files need to be made to the backup image.

On the other hand, if at least one set of PnP IDs do not match (decision block 128, "no" leg), and enumeration (Enum) key may be included under the key shown at reference numeral 126. The Enum key may be used to complete the key shown at reference numeral 130. From the key at reference numeral 130, the driver class globally unique identifier (GUID) and upper and lower filters may be determined (block 132). Upper and lower filters may also be drivers that may be used in a "driver stack" with the main driver, and may provide additional functionality to aid the operation of the main driver. The upper filter is between the application software (and other requesters) and the main driver, and the lower filter is between the main driver and the hardware device. Both upper and lower filters are optional. If one or more filters are found (decision block 140, "yes" leg), the filters may be used as service names and the process of blocks 124 and 128 may be repeated until each layer of the driver stack has been discovered.

If additional filters are not located (decision block 140, "no" leg), then for each driver class GUID, the corresponding INF files and INF sections may be located (block 134) at the key shown at reference numeral 136. The INF files may then be parsed to determine the driver files to copy (block 138). The driver files may include main drivers, upper drivers, and lower drivers. Additionally, the keys consulted in the flowchart of FIG. 9 (reference numerals 122, 126, 130, and 136) may be the keys to be copied to the registry in the backup image from the source registry. The copying of files and keys may proceed as illustrated in FIG. 8 (block 114).

Some embodiments described above have been in the context of backup and restore. Other embodiments may use the features described herein for other purposes. For example, provisioning software (such as the OpForce™ product from VERITAS Software Corporation) may implement the above description to permit using an image snapshot from one computer system to provision other computer systems having differing hardware devices (by updating the image similar to the backup image). Such a system may avoid, in some embodiments, a manual install of the corresponding software to snapshot an image having the desired drivers in it. Any automated deployment system may implement the described mechanisms. Similarly, volume or file replication may employ the method to update replicated volumes/files that include the OS, so that the replicated volumes/files may be restored to a computer system having differing hardware devices.

Figure 10:
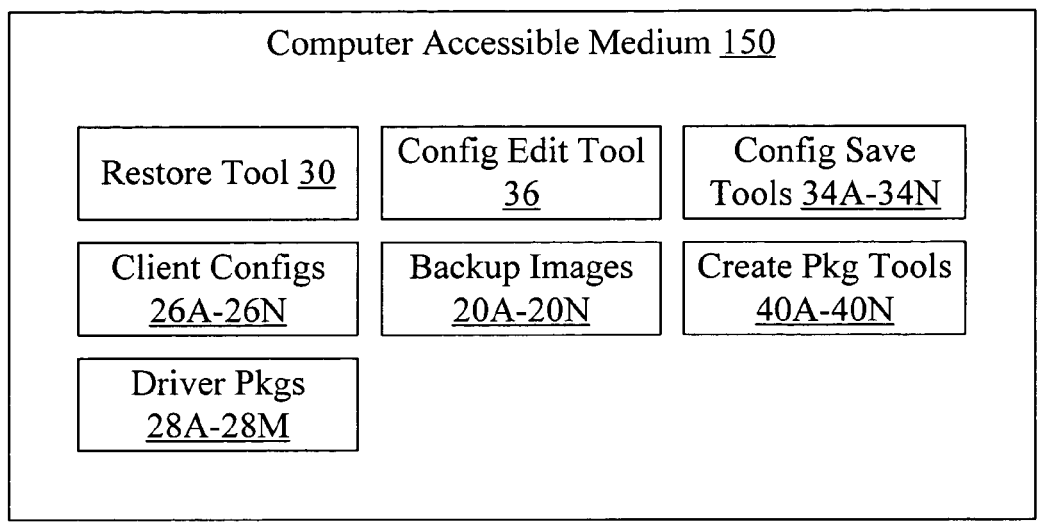
FIG. 10 is a flowchart illustrating one embodiment of a computer accessible medium.

Turning now to FIG. 10, a block diagram of a computer accessible medium 150 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 150 in FIG. 10 may be encoded with one or more of the restore tool 30, the config edit tool 36, one or more config save tools 34A-34N, one or more client configuration files 26A-26N, one or more backup images 20A-20N, one or more create package tools 40A-40N, and/or one or more driver packages 28A-28M. The restore tool 30, the config edit tool 26, the config save tools 34A-34N and the create package tools 40A-40N may each comprise instructions which, when executed, implement the operation described herein for the software. Generally, the computer accessible medium 150 may store any set of instructions which, when executed, implement a portion or all of the flowcharts shown in one or more of FIGS. 5-9. In some embodiments, a computer accessible medium similar to the computer accessible medium 150 may be included in a client 18A-18N, the BMR server 10, the boot server 12, the file server 14, and/or the backup server 16.

Numerous variations and modifications will become apparent to those skilled in the art once the above disclosure is fully appreciated. It is intended that the following claims be interpreted to embrace all such variations and modifications.

What is claimed is:

1. A computer accessible storage medium comprising a plurality of instructions which, when executed:
   cause a modification of an image of files created from a computer system having first hardware;
   cause a modification of a client configuration file that is separate from the image and that was created at a same time as the image, wherein the client configuration file describes a configuration of the computer system from which the image was made, and wherein the modification is performed to reflect a difference in the first hardware and second hardware to which the image is to be copied; and
   cause the image to be copied to a computer system having the second hardware different from the first hardware, wherein a difference between the first hardware and the second hardware necessitates that the modification of the image be performed.

2. The computer accessible storage medium as recited in claim 1 wherein the image is a backup image.

3. The computer accessible storage medium as recited in claim 1 wherein the plurality of instructions, when executed, cause the modification prior to the image being copied to the computer system having the second hardware.

4. The computer accessible storage medium as recited in claim 1 wherein the plurality of instructions, when executed, cause the modification subsequent to the image being copied to the computer system having the second hardware but prior to activating an operating system within the image on the computer system having the second hardware.

5. The computer accessible storage medium as recited in claim 1 wherein the modification comprises adding one or more files to the image.

6. The computer accessible storage medium as recited in claim 5 wherein the one or more files comprise one or more drivers, each of the one or more drivers corresponding to a device that is included in the second hardware and is not included in the first hardware.

7. The computer accessible storage medium as recited in claim 1 wherein the modification comprises changing one or more existing files within the image.

8. The computer accessible storage medium as recited in claim 7 wherein the existing files identify one or more drivers to be used for one or more devices.

9. The computer accessible storage medium as recited in claim 8 wherein the files comprise a registry.

10. The computer accessible storage medium as recited in claim 7 wherein the existing files comprise hardware abstraction layer code.

11. The computer accessible storage medium as recited in claim 7 wherein the existing files comprise kernel code.

12. The computer accessible storage medium as recited in claim 1 wherein the plurality of instructions, when executed:
   cause a compare of data from a source that identifies one or more hardware devices in the second hardware to corresponding data in the image;
   cause one or more drivers corresponding to the one or more hardware devices to be added to the image; and
   cause an update of the corresponding data in the image with the data from the source.

13. The computer accessible storage medium as recited in claim 12 wherein the source comprises software running on the computer system having the second hardware.

14. The computer accessible storage medium as recited in claim 12 wherein the source comprises a different image created from a computer system having equivalent hardware to the second hardware.

15. The computer accessible storage medium as recited in claim 12 wherein the source comprises a different computer system having equivalent hardware to the second hardware.

16. A method comprising:
   modifying an image of files created from a computer system having first hardware;
   modifying a client configuration file that is separate from the image and that was created at a same time as the image, wherein the client configuration file describes a configuration of the computer system from which the image was made, and wherein the modification is performed to reflect a difference in the first hardware and second hardware to which the image is to be copied; and
   copying the image to a computer system having the second hardware different from the first hardware, wherein a difference between the first hardware and the second hardware necessitates that the modification of the image be performed.

17. The method as recited in claim 16 wherein the image is a backup image.

18. The method as recited in claim 16 wherein the modifying is performed prior to the copying.

19. The method as recited in claim 16 wherein the modifying is performed subsequent to the copying but prior to activating an operating system within the image on the computer system having the second hardware.

20. The method as recited in claim 16 wherein the modifying comprises adding one or more files to the image.

21. The method as recited in claim 20 wherein the one or more files comprise one or more drivers, each of the one or more drivers corresponding to a device that is included in the second hardware and is not included in the first hardware.

22. The method as recited in claim 16 wherein the modification comprises changing one or more existing files within the image.

23. The method as recited in claim 22 wherein the existing files identify one or more drivers to be used for one or more devices.

24. The method as recited in claim 22 wherein the existing files comprise hardware abstraction layer code.

25. The method as recited in claim 22 wherein the existing files comprise kernel code.

26. The method as recited in claim 16 further comprising:
   comparing data from a source that identifies one or more hardware devices in the second hardware to corresponding data in the image;
   adding one or more drivers corresponding to the one or more hardware devices to the image; and
   updating the corresponding data in the image with the data from the source.

27. A computer accessible storage medium comprising a plurality of instructions which, when executed:
   compare operating system data from an image created from a computer system having first hardware to corresponding operating system data from a source, wherein the corresponding operating system data identifies one or more hardware devices in a computer system having second hardware, and wherein the operating system in the image is not executing;
   in response to detecting that at least a first hardware device in the second hardware is not in the first hardware, add at least a first driver corresponding to the first hardware device to the image;
   in response to detecting that at least the first hardware device in the second hardware is not in the first hardware, modify a client configuration file that is separate from the image and that was created at a same time as the image, wherein the client configuration file describes a configuration of the computer system from which the image was made, and wherein the modification is performed to reflect a difference in the first hardware and second hardware to which the image is to be copied; and
   update the operating system data in the image that identifies the first hardware device with the corresponding operating system data from the source.

28. The computer accessible storage medium as recited in claim 27 wherein the source comprises software running on the computer system having the second hardware.

29. The computer accessible storage medium as recited in claim 27 wherein the source comprises a different image created from a computer system having equivalent hardware to the second hardware.

30. The computer accessible storage medium as recited in claim 27 wherein the source comprises a different computer system having equivalent hardware to the second hardware.

* * * * *